United States Patent Office 3,053,977
Patented Sept. 11, 1962

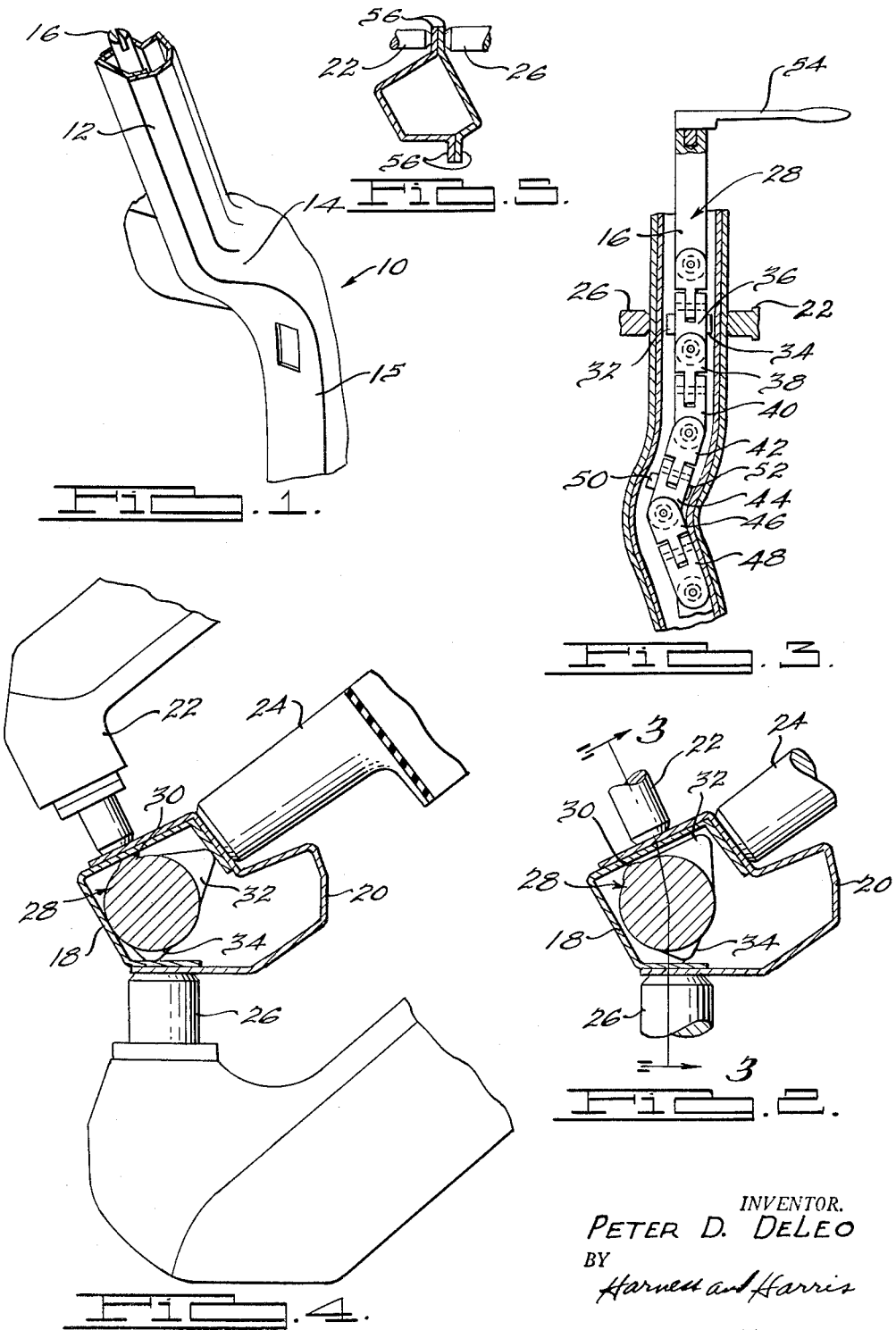

3,053,977
WELDING APPARATUS
Peter D. de Leo, Detroit, Mich., assignor to Chrysler Corporation, Highland Park, Mich., a corporation of Delaware
Filed June 24, 1959, Ser. No. 822,521
3 Claims. (Cl. 219—160)

This invention relates to improvements in bucking bars for welding apparatus utilizable for spotwelding curved metal sections forming elongated tubular structures not provided with exterior welding tab or flange portions.

Heretofore the separate metal sections of tortuously curved structures such as the front pillars and door frames for example of automobiles have had to be provided with exterior welding edges or flanges (see FIGURE 5) for overlapping one another to provide sufficient resistance to the electrodes of the spotwelding presses for developing sufficient pressure contact to produce a good spotweld. It has not been possible to satisfactorily weld straight through the overlapping walls of the tubular structure since there was no convenient method to back up the inner metal section so as to allow the spotwelding press to develop the necessary spotwelding contact pressure between the overlapping walls of the two metal sections. It is not always desirable in front pillars and door frames, etc. of automobiles to provide these extra tabs or flanges for the spotwelding since there is an increased cost in the metal and also there is increased space required for the additional flange structure. Applicant has overcome the necessity for these extra flanges by providing a novel type bucking bar or welding mandrel which can readily be inserted into the tortuous tube formed by sheet metal structure such as the aforesaid pillar and which bar may then be rotated to cam certain portions thereon into contact with the interior surface of the metal sections forming the tube to provide a sufficiently rigid structure for welding when the press electrodes are brought into welding contact with the exterior portions of the metal sections.

It is a principal object of this invention therefore to provide a welding mandrel of the aforesaid type which can be utilized to weld tortuously curved sheet metal tubes and which eliminate thereby the necessity for additional welding flanges extending from the metal sections forming the tubes.

Further objects and advantages of the present invention will become apparent from the following description and drawings, in which:

FIGURE 1 represents a side elevational view of a front pillar of an automobile with applicant's welding mandrel inserted therein;

FIGURE 2 represents a cross sectional view of a section of the pillar of FIGURE 1 showing the mandrel therein with the cam portions in an inactive position;

FIGURE 3 represents a longitudinal sectional view of the structure of FIGURE 2 taken along the lines 3—3 thereof in the direction of the arrows;

FIGURE 4 represents the structure of FIGURE 2 with the mandrel rotated and the bucking cam portions thereof into contact with the sheet metal sections; and FIGURE 5 represents a cross sectional view of the prior art flange welding technique.

Referring to FIGURE 1 the automotive pillar 10 of a conventional shape is of a tortuous configuration with an upwardly extending straight portion 12 merging with an extreme curved portion 14 which then merges with a slightly curved portion 15. As shown in this figure the top portion only 16 of the bucking bar is shown and the other portions thereof extend down into the pillar 10.

In FIGURE 2 the pillar 10 is shown as comprised of two sheet metal sections 18 and 20 which have overlapping portions to produce a double thickness of metal which may be welded by the welding electrodes 22 and 26 of a spotwelding press. The bucking bar 28 is in a position such that the welding bucking cam portions 30, 32 and 34 are out of contact with the metal sections 18 and 20. Member 24 is an insulated clamp.

Shown in FIGURE 3 the bucking bar 28 is seen to comprise a plurality of sections 16, 36, 38, 40, 42, 44, 46 and 48, and it is obvious that other sections could be placed onto the bar 28 should its length be desired to be extended. All of these sections are joined together by the universal type of joint and may be provided with the necessary cam portions at any positions thereon as required for welding. As shown in this FIGURE 3, the welding electrodes 22 and 26 are adjacent the cam segments 34 and 30 of the bucking bar. Other cam segments 50 and 52 are shown on segment 44 of the bar and may be cammed into an active position similarly shown in FIGURE 4 to provide additional spotwelding spaced a predetermined distance from that provided by cams 30 and 34. It is noted that segments 50 and 52 as shown and other cam segments may be curved to conform to the inner curvature of the tube. Moreover, the diameter and length of the bar and cam segments thereon may obviously be adjusted to conform to a particular size workpiece.

Referring to FIGURE 4, it is seen that the cam portions 30, 32 and 34 are brought into contact with the metal sections to press them tightly against themselves and the members 22, 24 and 26. When these metal sections are so pressed by the rotation of the mandrel, which may be done manually by the use of the torque producing arm 54 shown in FIGURE 3, the current to the electrodes 22 and 26 may be turned on for the short period of time necessary to produce the spotweld between the two metal sections in the conventional spotwelding manner. Thereafter the rotation of the mandrel in the opposite direction will unlock the cam portions as shown in FIGURE 2 and allow the bucking bar 28 to be withdrawn. It is obvious that the bucking bar could be made into one continuous length should it be desired to weld two relatively straight sections of metal.

By this apparatus and method the flanges 56 of the prior art pillars and other structures as shown in FIGURE 5 are conveniently eliminated.

I claim:

1. A bucking bar for use in spotwelding overlapping wall portions of tubular structures having cross-sectional dimensions differing between angularly spaced lines in a common plane comprising an elongated body having cam portions angularly spaced therearound, said cam portions being dimensioned and positioned to permit insertion of said body portion into said tubular structure in an inoperative position in which said cam surfaces correspond with larger ones of said cross-sectional dimensions and subsequent rotation into an operative position in which said cam portions operatively engage the inside of the wall of said tubular structure at said overlapping wall portions in juxtaposition to welding electrodes engaging the outside of said overlapping wall portions.

2. A bucking bar for use in spotwelding overlapping wall portions of tubular structures having cross-sectional dimensions differing between angularly spaced lines in a common plane comprising an elongated segmented body portion, said segments being flexibly joined by universal joint means, and cam portions on at least one of said segments angularly spaced and dimensioned to permit insertion of said body portion into said tubular structure in an inoperative position in which said cam surfaces correspond with larger ones of said cross-sectional dimensions and subsequent rotation thereof into an opertive position in which said cam portions operatively engage the inside of the wall of said tubular structure in juxtaposition to welding electrodes engaging the exterior of said wall at overlapping wall portions.

3. A bucking bar for use in spotwelding overlapping wall portions of a tubular structure having cross-sectional dimensions differing between angularly spaced lines in a common plane and comprising a body portion having cam surfaces thereon angularly positioned with respect to each other in a pattern corresponding to larger ones of said differing cross-sectional dimensions, said body portion thereby being adapted for insertion longitudinally into said tubular structure in an inoperative position wherein said cam surfaces correspond with said larger cross-sectional dimensions and said body portion also being adapted for subsequent rotation into an operative position in which said cam surfaces engage the inside of the wall of said tubular structure in juxtaposition to welding electrodes engaging the outside of said wall at overlapping wall portions.

References Cited in the file of this patent
UNITED STATES PATENTS

| | | |
|---|---|---|
| 725,874 | Riley | Apr. 21, 1903 |
| 1,166,284 | Vroman | Dec. 28, 1915 |
| 1,534,314 | Heintz | Apr. 21, 1925 |
| 1,856,470 | Day | May 3, 1932 |
| 1,995,368 | Sunnen | Mar. 26, 1935 |
| 2,043,020 | Thiemer | June 2, 1936 |
| 2,430,266 | Zimmerman | Nov. 4, 1947 |
| 2,503,431 | Bender et al. | Apr. 11, 1950 |
| 2,916,077 | Fuchs | Dec. 8, 1959 |